(12) United States Patent
Yamamoto et al.

(10) Patent No.: US 11,616,892 B2
(45) Date of Patent: Mar. 28, 2023

(54) PRINTING SYSTEM, PRINT MEDIUM SPECIFYING METHOD, AND MEDIUM INFORMATION PROVIDING DEVICE

(71) Applicant: SEIKO EPSON CORPORATION, Tokyo (JP)

(72) Inventors: Yuko Yamamoto, Nagano (JP); Takahiro Kamada, Nagano (JP); Mitsuhiro Yamashita, Nagano (JP); Shotaro Matsuda, Nagano (JP); Ryoki Watanabe, Nagano (JP); Kenji Matsuzaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/523,984

(22) Filed: Nov. 11, 2021

(65) Prior Publication Data
US 2022/0159140 A1 May 19, 2022

(30) Foreign Application Priority Data
Nov. 13, 2020 (JP) .............................. JP2020-189097

(51) Int. Cl.
*H04N 1/23* (2006.01)
*B41J 11/00* (2006.01)
(Continued)

(52) U.S. Cl.
CPC .......... *H04N 1/2323* (2013.01); *B41J 11/009* (2013.01); *G06F 3/1203* (2013.01);
(Continued)

(58) Field of Classification Search
None
See application file for complete search history.

(56) References Cited

U.S. PATENT DOCUMENTS

| 2013/0127946 | A1* | 5/2013 | Kanai | ................... B41J 29/393 347/19 |
| 2015/0339558 | A1* | 11/2015 | Kanai | ................... B41J 11/009 358/1.6 |

(Continued)

FOREIGN PATENT DOCUMENTS

| JP | 2006-154913 A | 6/2006 |
| JP | 2011196717 A | * 10/2011 |

(Continued)

OTHER PUBLICATIONS

Ajioka (JP-2011-196717A) English Translation; Abstract, Figs 3, 4 (Year: 2011).*
Lin (JP-2022146143A) English Translation; Claim 5 (Year: 2022).*

*Primary Examiner* — Miya J Williams
*Assistant Examiner* — Miya J Cato
(74) *Attorney, Agent, or Firm* — Global IP Counselors, LLP

(57) ABSTRACT

For a plurality of types of print media, a pre-trained model is prepared, the pre-trained model being generated by machine learning based on spectroscopic information of an unprinted area on the print medium and an identifier indicating the type of the print medium and using the identifier as a trainer. The spectroscopic information of the unprinted area on the print medium to print on is acquired. The acquired spectroscopic information is applied to the pre-trained model. Using a result thereof, auxiliary information about the type of the print medium is outputted. A specification of the type of the print medium using the outputted auxiliary information is accepted. When the type of the print medium is thus specified, printing is performed using a print condition suitable for the print medium.

10 Claims, 10 Drawing Sheets

(51) Int. Cl.
*G06F 3/12* (2006.01)
*G06N 3/08* (2023.01)
*H04N 1/60* (2006.01)
*H04N 1/00* (2006.01)

(52) U.S. Cl.
CPC ............ *G06F 3/1237* (2013.01); *G06N 3/08* (2013.01); *H04N 1/00724* (2013.01); *H04N 1/00726* (2013.01); *H04N 1/6097* (2013.01)

(56) References Cited

U.S. PATENT DOCUMENTS

2017/0126933 A1* 5/2017 Kanai ................ H04N 1/00023
2020/0240843 A1* 7/2020 Kanai ....................... G01J 3/50

FOREIGN PATENT DOCUMENTS

JP 2015-121882 A 7/2015
JP 2022146143 A * 10/2022

* cited by examiner

FIG. 9

| MEDIUM TYPE | A | B | C | D | E | F | G | H | I | J | K | L | M | N |
|---|---|---|---|---|---|---|---|---|---|---|---|---|---|---|
| DEGREE OF SIMILARITY | 0.5 | 0 | -1.0 | -0.4 | 0.4 | 0.2 | 0.3 | 0 | 0.5 | 0.6 | 0.2 | -0.8 | 0.1 | 0.4 |

FIG. 10

DETERMINED AS NEW MEDIUM

○ SELECT FROM EXISTING MEDIA

MEDIUM WITH HIGH DEGREE OF SIMILARITY

| MEDIUM TYPE | DEGREE OF SIMILARITY |
|---|---|
| ○ J | 0.6 |
| ○ A | 0.5 |
| ○ I | 0.5 |
| ○ E | 0.4 |
| ○ N | 0.4 |

○ NEWLY PREPARE PRINT SETTING

ENTER

PRINTING SYSTEM, PRINT MEDIUM SPECIFYING METHOD, AND MEDIUM INFORMATION PROVIDING DEVICE

The present application is based on, and claims priority from JP Application Serial Number 2020-189097, filed Nov. 13, 2020, the disclosure of which is hereby incorporated by reference herein in its entirety.

BACKGROUND

1. Technical Field

The present disclosure relates to a technique for specifying the type of a medium in order to perform processing on the medium such as printing or playback.

2. Related Art

In printing using an ink, the type of a print medium (hereinafter referred to as a medium) such as a paper onto which the ink is ejected is determined and the amount of ink injection or the like is adjusted accordingly. In such a case, it is necessary to determine the type of the medium to print on. According to JP-A-2006-154913, determination information for determining the type of the medium is generated, and based on the result of determination with the determination information, a list of media of the corresponding type is displayed. Then, a print setting is selected from the list. When the medium is determined as a new medium, the medium can be registered as a new medium, or a medium can be selected from existing medium types.

However, in the technique described in JP-A-2006-154913, in the case of a new medium, though the medium can be registered as a new medium, a corresponding print mode is simply selected from among existing modes. While the name of the registered new medium can be changed, a print mode simply selected from among existing modes is used. That is, even though the medium can be determined as a new medium, there is no information to assist the determination, thus making it difficult to link the new medium with an appropriate print mode. Also, in selecting a medium from among existing medium types, options are simply provided without any determination information for selection regarding which one of the existing media is appropriate. Therefore, it is difficult for a user to select an appropriate existing medium type.

SUMMARY

The present disclosure can be implemented according to the following aspects or application examples.

(1) A first aspect of the present disclosure is directed to a printing system for printing on a print medium. The printing system includes: a storage unit storing, for a plurality of types of print media, a pre-trained model generated in advance by machine learning based on spectroscopic information of an unprinted area on the print medium and an identifier indicating the type of the print medium and using the identifier as a trainer; a spectroscopic information acquisition unit acquiring the spectroscopic information of the unprinted area on the print medium to print on; an output unit outputting auxiliary information about the type of the print medium, using a result of applying the acquired spectroscopic information to the pre-trained model that is stored; and a specification unit accepting a specification of the type of the print medium using the auxiliary information outputted from the output unit.

(2) A second aspect of the present disclosure is directed to a print medium specifying method for specifying a print medium. The print medium specifying method includes: preparing, for a plurality of types of print media, a pre-trained model generated by machine learning based on spectroscopic information of an unprinted area on the print medium and an identifier indicating the type of the print medium and using the identifier as a trainer; acquiring the spectroscopic information of the unprinted area on the print medium to print on; outputting auxiliary information about the type of the print medium, using a result of recognition where the acquired spectroscopic information is applied to the pre-trained model; and accepting a specification of the type of the print medium using the outputted auxiliary information.

(3) A third aspect of the present disclosure is directed to a medium information providing device. The medium information providing device includes: a storage unit storing, for a plurality of types of media, a pre-trained model generated by machine learning provided with spectroscopic information of a ground color of the medium and an identifier indicating the type of the medium and using the identifier as a trainer; a spectroscopic information acquisition unit acquiring the spectroscopic information of the ground color of the medium to be processed; and an output unit outputting auxiliary information about the type of the medium, using a result of applying the acquired spectroscopic information to the pre-trained model.

BRIEF DESCRIPTION OF THE DRAWINGS

FIG. 9 is an explanatory view showing an example of displaying a medium type and a degree of similarity.

FIG. 10 is an explanatory view showing an example of a dialog box when a medium is determined as a new medium.

DESCRIPTION OF EXEMPLARY EMBODIMENTS

A. First Embodiment (1) Configuration of Printer 20

Figure 1:
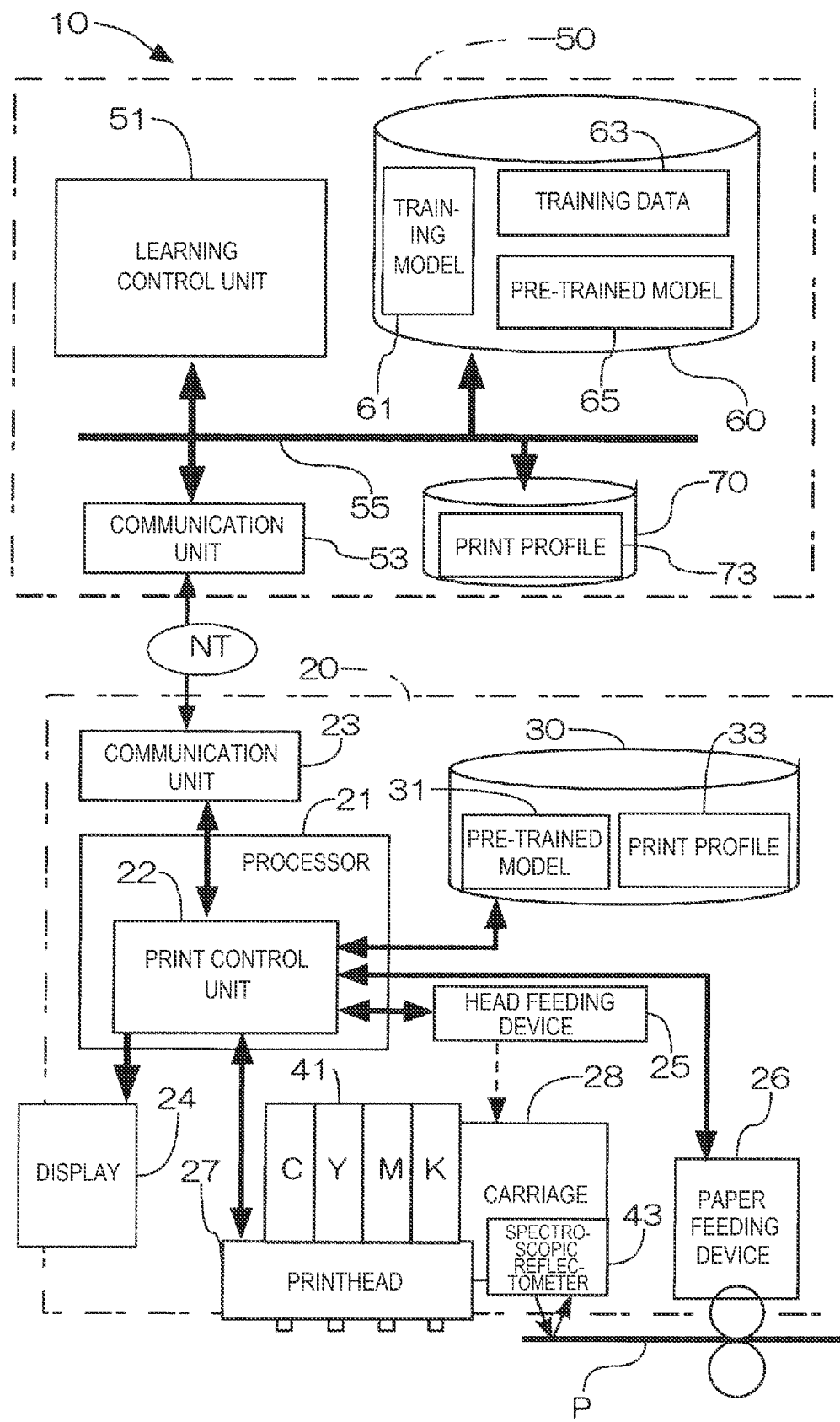
FIG. 1 shows a schematic configuration of a printing system according to an embodiment.

FIG. 1 is a block diagram showing the configuration of a printing system 10 according to an embodiment. The printing system 10 has a printer 20 and a machine learning device 50. The printer 20 and the machine learning device 50 are coupled to each other via a network NT. The network NT may be wired or wireless. The printer 20 and the machine learning device 50 may be coupled to each other via a public network such as the internet or may be directly coupled to each other. In this embodiment, the machine learning device 50 is implemented as a device in a so-called cloud.

The printer 20 has a processor 21, a communication unit 23, a display 24, a non-volatile memory 30, a head feeding device 25, a paper feeding device 26, a printhead 27, and the like. The processor 21 operates as a print control unit 22 controlling the entirety of the printer 20 to perform printing. The print control unit 22 can exchange data with the machine learning device 50 via the communication unit 23. The print control unit 22 can also access the non-volatile memory 30 and refer to a pre-trained model 31 and a print profile 33, described later. The print control unit 22 functions as a print medium recognition unit recognizing the type of a print medium, using the pre-trained model 31.

In this embodiment, the printer 20 has the processor 21 having a CPU, a RAM and the like, and the non-volatile memory 30. The processor 21 executes various programs such as a print control program recorded in the non-volatile memory 30 and thus implements functions of the print control unit 22. The print control unit 22 displays necessary information for printing, on the display 24. The display 24 is provided with a touch panel, which enables a user to refer to information displayed thereon and give an instruction or select a parameter or the like in some cases. Such processing, too, is implemented as a function of the print control unit 22 by executing a prepared program.

The print control unit 22 causes a carriage 28 with the printhead 27 installed therein to move forward and backward in the direction of the width of a print medium P (referred to as a main scanning direction), using the head feeding device 25. The print control unit 22 can also feed the print medium P in a direction intersecting the main scanning direction (sub scanning direction), using the paper feeding device 26. In the carriage 28, an ink cartridge 41 accommodating four color inks of cyan C, magenta M, yellow Y, and black K separately from each other can be installed. The inks in the ink cartridge 41 are supplied to nozzles provided in the printhead 27 and are ejected onto the print medium P in response to an instruction from the print control unit 22. Therefore, the print control unit 22 can form an image on the print medium P by causing the printhead 27 to eject the ink from each nozzle in conjunction with the feeding of the print medium P in the sub scanning direction and the forward and backward movement of the printhead 27 in the main scanning direction.

In this embodiment, the printer 20 is a so-called inkjet serial printer. However, other types of printers than the inkjet printer, for example, a so-called page printer such as a laser printer, may also be employed. Alternatively, a thermal sublimation printer or the like may be employed. Any printer can be used as long as the printer performs printing by setting different printing condition according to the type of the print medium P, for example, in a case of an inkjet printer, an upper limit of the amount of ink injection (ink duty) per print medium P, a drying temperature of a heater for drying the ink if such a heater is provided, a feeding speed of the print medium P or the like.

The carriage 28 is provided with a spectroscopic reflectometer 43 as a spectroscopic information acquisition unit. The spectroscopic reflectometer 43 is provided with an LED that casts light within a range of visible light wavelengths and a sensor that detects the intensity of the light from the LED reflected off the print medium P, every predetermined wavelength range, for example, every 10 nm. The spectroscopic reflectometer 43 is provided at the distal end in the sub scanning direction of the carriage 28 and therefore can detect the spectroscopic reflectance of an unprinted part at the distal end of the print medium P that is fed, before printing. As the spectroscopic information, the spectroscopic transmittance, which is the rate of transmission of light through the print medium P, may be used as well as the spectroscopic reflectance. In such a case, the LED for light emission and the sensor for light reception may be provided at positions opposite each other via the print medium P.

The data of the spectroscopic reflectance acquired from the spectroscopic reflectometer 43 is used to specify the type of the print medium P. In this embodiment, the print control unit 22 provides the data of the spectroscopic reflectance detected using the spectroscopic reflectometer 43 to the pre-trained model 31 stored in the non-volatile memory 30 and thus recognizes the type of the print medium P. A technique for recognizing the type of the print medium P using the spectroscopic reflectance will be described in detail later. On recognizing the type of the print medium P, the print control unit 22 reads out the print profile 33 corresponding to the type of the print medium P to print on, from the non-volatile memory 30. The print profile 33 normally includes a plurality of types of parameters and is therefore prepared as a set of a plurality of print parameters corresponding to the type of the print medium P.

In this embodiment, the type of the print medium P is specified, based on an identifier number indicating the type of the print medium P and a parameter indicating that the print medium P is a print medium of this type, by providing the data of the spectroscopic reflectance to the pre-trained model 31. The identifier number indicating the type of the print medium P and the parameter indicating the probability of the print medium P being a print medium of this type are referred to as auxiliary information relating to the type of the print medium.

The pre-trained model 31 is prepared by supervised machine learning. The pre-trained model 31 is prepared in advance and installed in the non-volatile memory 30 of the printer 20. The pre-trained model 31 is generated, based on deep learning by the machine learning device 50. The pre-trained model 31 generated by the machine learning device 50 is downloaded to the printer 20 via the communication unit 23 before printing.

(2) Configuration of Machine Learning Device 50

The machine learning device 50 placed in a cloud has a learning control unit 51, a communication unit 53, a machine learning unit 60, a non-volatile memory 70, and a bus 55 coupling these components, as illustrated. The communication unit 53 communicates with the communication unit 23 of the printer 20 and thus exchanges data with the printer 20.

The machine learning unit 60 has a dedicated processor for performing supervised machine learning, and a memory. In the memory, a training model 61, training data 63, and a dedicated training program are stored. As the training program is executed, the training model is trained using the training data 63 and a pre-trained model 65 is thus generated. The pre-trained model 65 is a pre-trained model generated using the training model 61, based on training data acquired up to a certain time point. When downloaded to each printer 20 via the communication unit 53, the pre-trained model 65 is handled as the pre-trained model 31 in the printer 20. At the point when the pre-trained model 65 is downloaded, the pre-trained model 65 in the machine learning device 50 and the pre-trained model 31 in the printer 20 are the same.

In this embodiment, the machine learning device 50 performs machine learning using the training model 61, based on the data of the spectroscopic reflectance of each of various types of print media P and the identifier indicating the type of the print medium P corresponding the data of the spectroscopic reflectance, as the training data 63. This machine learning utilizes the fact that the characteristic of the spectroscopic reflectance varies depending on the type of the print medium P. In the case of a white paper with no fluorescent brightener added, the reflectance tends to have little change in each wavelength range. Meanwhile, in the case of a white paper with a fluorescent brightener added, the reflectance tends to increase in a short wavelength range. In this way, the spectroscopic reflectance of the print medium P includes color information of the surface of the print medium P and information about whether a fluorescent brightener is added or not.

Figure 2:
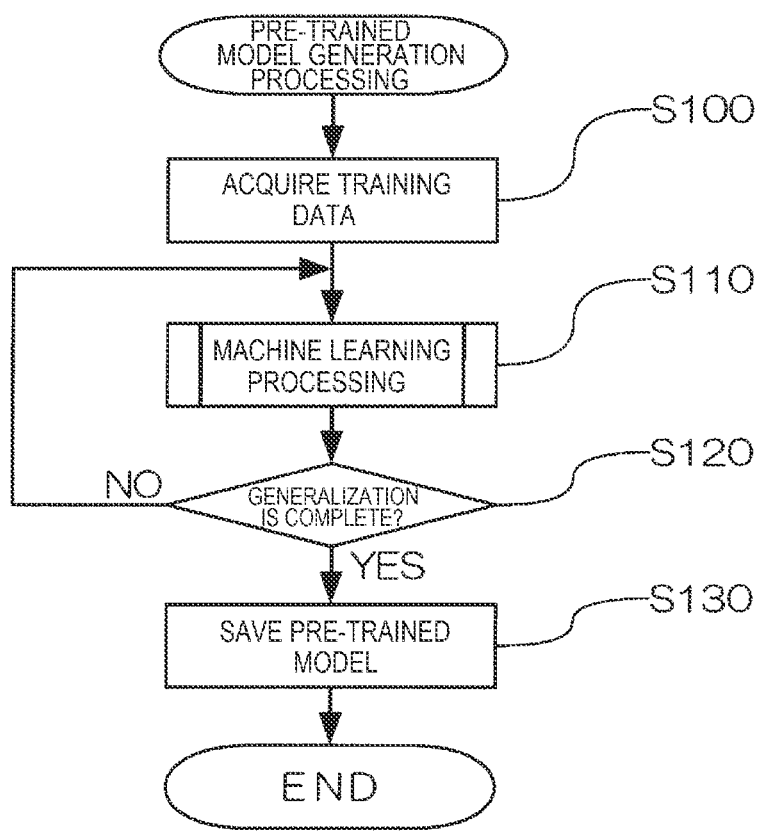
FIG. 2 is a flowchart showing pre-trained model generation processing.

FIG. 2 is a flowchart showing processing in which the machine learning unit 60 performs machine learning and generates a pre-trained model. By the time this processing is started, training data which associates the data of the spectroscopic reflectance of each of a plurality of types of print media P with the identifier identifying the type of the print medium P is gathered. The processing of generating a pre-trained model is performed, based on this training data. Therefore, there is no problem even if the machine learning device 50 and the printer 20 are not coupled to each other when performing the processing of generating a pre-trained model.

When the processing is started, first, processing of acquiring the training data 63 is performed (step S100). The training data 63 is gathered in advance before the processing. In this embodiment, data of the spectroscopic reflectance of 20 types of media from media A to media T, which is the training data, is gathered and saved in the memory. After the training data 63 is acquired, machine learning processing using the training model 61 (step S110) is performed until generalization is completed (step S120). The machine learning is performed with the training data 63 provided for the training model 61, and the pre-trained model 65 is thus generated. Therefore, the generated pre-trained model 65 is finally saved as the pre-trained model 65. At the point when the printer 20 is coupled to the machine learning device 50, the pre-trained model 65 thus saved is transferred to the printer 20 and saved in the non-volatile memory 30.

Figure 3:
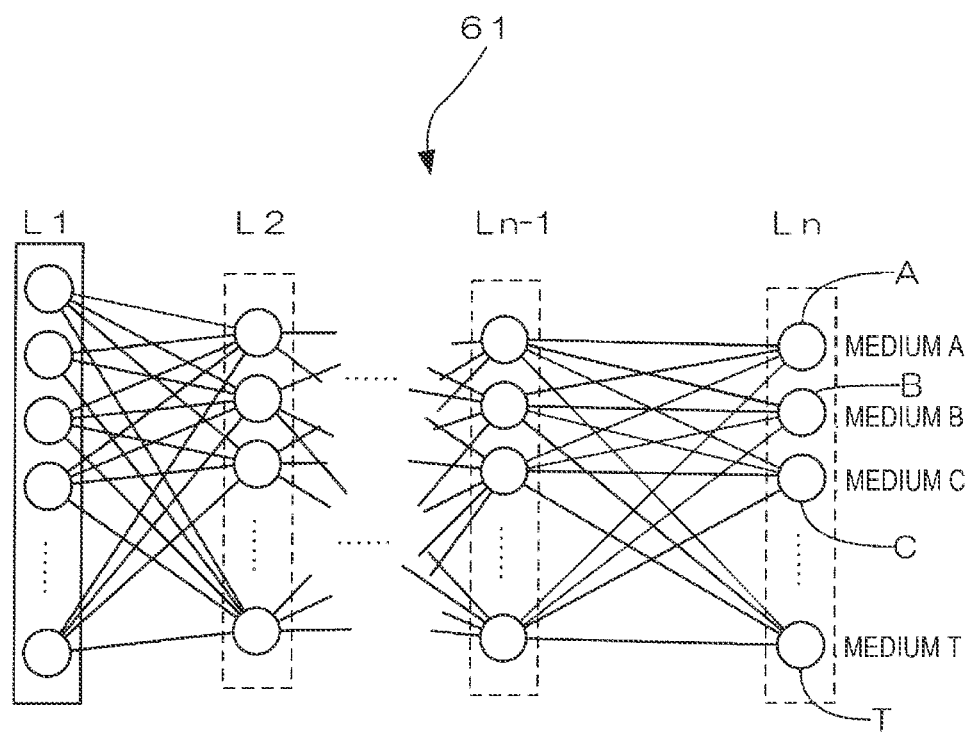
FIG. 3 shows a schematic configuration of a supervised machine learning device.

The training model for machine learning can be defined in various manners. FIG. 3 schematically shows an example of the model used in this embodiment. In FIG. 3, all the n layers in a CNN (convolutional neural network) are illustrated as rectangular parallelepipeds L1 to Ln, and nodes in an ordinary neural network are illustrated as white circles. In this embodiment, the CNN is used for the data of the spectroscopic reflectance. However, there is no problem in using other models such as various other neural networks like a capsule network or a vector neural network. An example of this is a configuration using a vector neural network disclosed in Japanese Patent Application 2020-94205, which is another application by the present applicant. In this vector neural network-type model, an output from an intermediate layer can be used. The vector neural network where an output from an intermediate layer can be used is a known technique.

In the first layer L1, a plurality of nodes to which the reflectance for every predetermined wavelength is inputted are provided. In this embodiment, the spectroscopic reflectance for every predetermined wavelength represented by the spectroscopic reflectance data is employed as input data to each node in the first layer L1, which is the input layer, and final output data relating to the spectroscopic reflectance data is outputted from the final output layer Ln. The reflectance has a value of 0 or more and 1 or less. The transmittance for every predetermined wavelength can be used instead of the data of the spectroscopic reflectance. Also, both the spectroscopic reflectance and the spectroscopic transmittance can be used. When both the spectroscopic reflectance and the spectroscopic transmittance are used, two of the training model shown in FIG. 3 may be provided. The results of the spectroscopic reflectance and the spectroscopic transmittance may be outputted from the final layer in each model. A final output layer Ln that integrates the results from both models and determines the integrated results may be constructed to output the final result.

The output from each node in the first layer L1 is weighted with a predetermined weight and coupled to a node in the second layer. This similarly applies from the second layer L2 onward to the (n−1)th layer. As a task of correcting the weighting between nodes in their respective layers by using training data is repeated, learning is completed and the pre-trained model 65 is generated. This point will now be described in detail.

In learning, the machine learning unit 60 inputs one of the training data to the training model and calculates an output value from the final output layer Ln. In this case, which node in the final output layer Ln corresponds to which medium type is decided in advance. For example, when the print medium P is the medium A, learning is performed in such a way that a node A outputs a value close to 1. One training data is provided for the training model 61. The machine learning unit 60 evaluates the values outputted from the nodes A to T in the final output layer Ln, based on a loss function. That is, for example, when the training data is for the medium A, a state where the node A outputs a value 1 while the other nodes B to T output a value 0 is defined as a target state, and a difference from the actual outputs (learning error) is specified by the loss function. Then, the machine learning unit 60 corrects the weighting between nodes. After the correction, the machine learning unit 60 finds a learning error again by the loss function, finds a difference (derivative value) from the previously found learning error, determines whether the learning error has decreased by the weighting or not, and corrects the weighting.

As the loss function for finding the learning error, various functions can be employed. For example, cross-entropy error or the like can be employed. Processing to calculate such a loss function is executed for all or a part of the data included in the training data 63, and the average or sum of these loss functions expresses the loss function in one session of learning. After the learning error in one session of learning is found, the machine learning unit 60 corrects the weighting by a prescribed optimization algorithm, for example, stochastic gradient descent or the like.

When the weighting is corrected a prescribed number of times for all the training data 63 in the foregoing manner, the machine learning unit 60 determines whether the generalization of the training model 61 is complete or not (step S120). That is, the machine learning unit 60 acquires the degree of coincidence between the input and output of the training model 61, using the training data 63. When the degree of coincidence is equal to or higher than a predetermined threshold, the machine learning unit 60 determines that the generalization is complete.

When it is not determined that the generalization is complete, the machine learning processing (step S110) is repeated. That is, the processing to correct the weighting is performed further and the computation and evaluation of the learning error using the loss function is repeated. The machine learning unit 60 may also perform other types of processing such as verification of the validity of a hyperparameter, as well as the supervised machine learning of the type of the print medium P as described above.

Each node in the final output layer Ln corresponds to the type (medium A, medium B . . . medium T) of the print medium P to be determined. Using the training data, standardization is performed in such a way that the sum of the output values from the nodes in the final output layer Ln when one training data is provided is 1. The type of the print medium P corresponding to the node with the highest output value in the final output layer Ln can be estimated to be the type of the print medium P for which each training data inputted to the input layer L1 is acquired. Ideally, it is desirable that when each training data is provided, the value of the output from one node in the final output layer Ln is 1 while the value of the outputs from the other nodes is 0, thus enabling the determination of the print medium P. However, the value of the output from each node in a multilayer neural network having a plurality of types of outputs is usually in a range higher than 0 and lower than 1. Therefore, the maximum value of the output value from each node in the final output layer Ln is handled as a parameter indicating the probability of the print medium P being a medium corresponding to the node.

In this way, in the machine learning device 50, the training data 63 is provided for the training model 61 and the training model 61 is made to perform learning, thus generating the pre-trained model 65. With respect to the type of the print medium P for which supervised machine learning is performed, a print profile 73 for printing on the print medium P of this type is prepared and saved in the non-volatile memory 70. The print profile 73 varies depending on the printer 20. In some cases, it may be difficult to store the print profile 73 for all the types of print media P in the printer 20. Therefore, the print profile 73 for some types of print media P may be stored in the non-volatile memory 70 of the machine learning device 50, which is in the cloud. Also, a dedicated site exclusively for storing the print profile 73 may be provided in the cloud and the print profile 73 may be prepared there.

The pre-trained model 65 generated by the machine learning device 50 is downloaded to each printer 20 according to need and becomes available for use in each printer 20. At this point, the printer 20 also downloads the data of the spectroscopic reflectance for each medium type that is learned along with the pre-trained model 65 and saves this data in the non-volatile memory 30. In the machine learning device 50, when a new medium is found, machine learning is performed, using supervised data with an identifier attached to the medium. Therefore, the pre-trained model 65 in the machine learning unit 60 is constantly updated to the latest one. Meanwhile, the pre-trained model saved in the non-volatile memory 30 of the printer 20 becomes the latest one at the point when each printer 20 downloads the pre-trained model. Until then, the two pre-trained models do not necessarily coincide with each other. Therefore, the pre-trained model used in each printer 20 is denoted by the reference number 31 and is distinguished from the pre-trained model 65 generated in the machine learning unit 60.

(3) Print Processing

Figure 4:
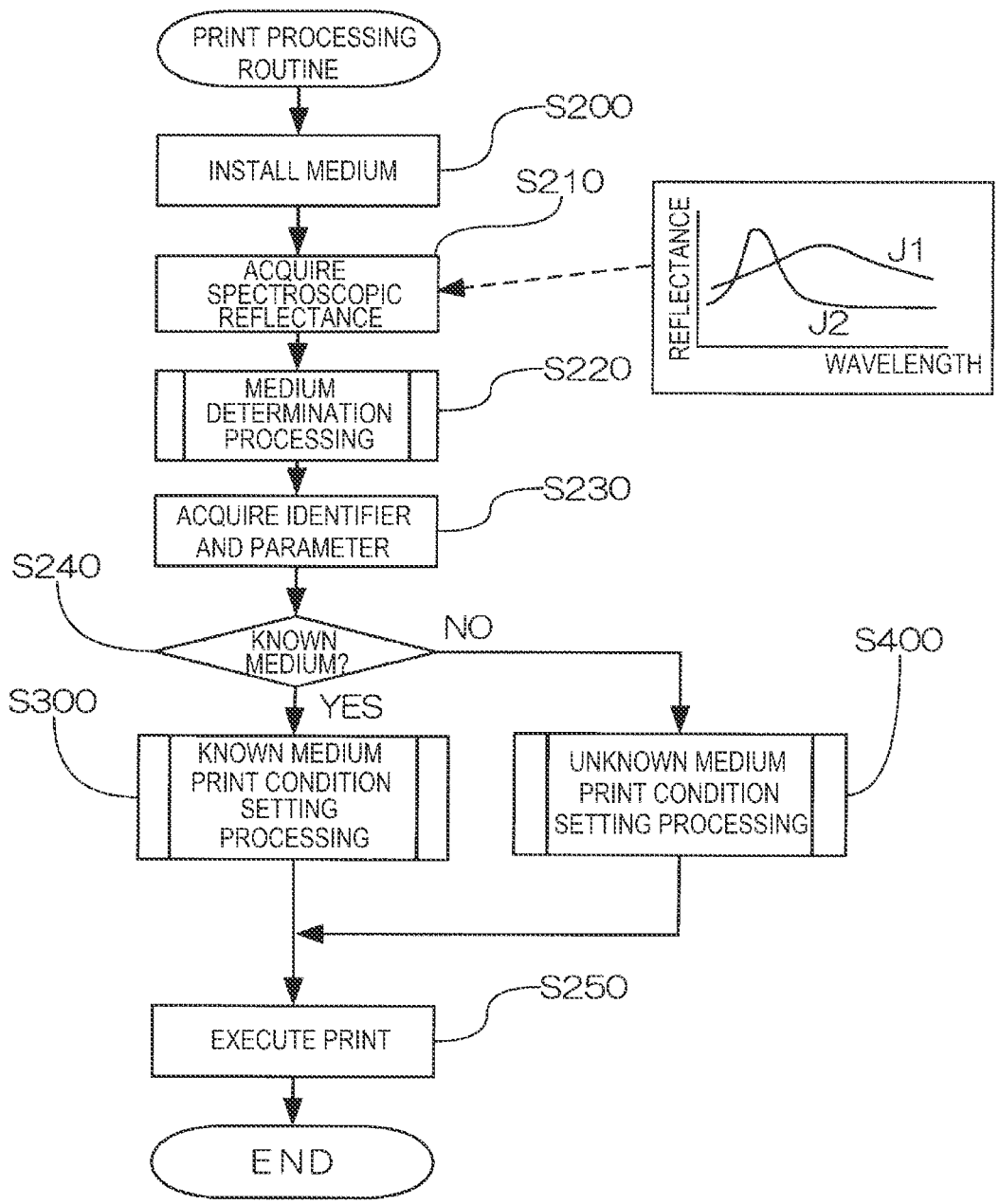
FIG. 4 is a flowchart showing a print processing routine.

FIG. 4 shows a print processing routine executed by the printer 20. In this example, it is assumed that, on receiving a print instruction from a computer, a mobile phone or the like, not illustrated, the printer 20 executes both medium determination processing (steps S200 to S400) and print processing (step S250) together. However, the printer 20 may separately execute the medium determination processing and the print processing. In the case where the print medium P is a paper roll or the like, the medium determination processing may be executed when the print medium P is loaded in the printer 20. In the case where the print medium P is a cut sheet, the medium determination processing may be executed for the first one sheet and subsequently the medium determination processing may be skipped until the print medium P is replaced. Before the processing routine shown in FIG. 4 is started, the pre-trained model 31 and the print profiles 33 corresponding to a plurality of types of print media P are saved in the non-volatile memory 30. When the processing shown in FIG. 4 is started, the processor 21 of the printer 20 performs processing of feeding the print medium P prepared in a tray or the like, not illustrated, until the forward end of the print medium P is located below the spectroscopic reflectometer 43 (step S200).

Next, the processor 21 performs processing of acquiring the spectroscopic reflectance of the print medium P, using the spectroscopic reflectometer 43 (step S210). The spectroscopic reflectance is acquired as a set of data of reflectance in a predetermined wavelength range of the cast light, in this example, every 10 nm. In FIG. 4, a solid line J1 shows an example of the spectroscopic reflectance of an ordinary print paper. In contrast, the print medium P coated with a fluorescent brightener has a higher reflectance in a short wavelength range than the ordinary print paper, as shown by a solid line J2. The spectroscopic reflectance may be measured by the printer 20 or may be measured by a dedicated measuring device and then acquired by the processor 21 via the communication unit 23, using communication or the like.

Next, the processor 21 performs medium determination processing of determining the type of the print medium, using the data of the spectroscopic reflectance acquired in step S210 and the pre-trained model 31 (step S220). The processor 21 inputs the acquired data of the spectroscopic reflectance to the pre-trained model 31 and acquires an output value. The processor 21 acquires an identifier indicating the type of the print medium P and a parameter, based on the output values from the intermediate layer and the final layer of the pre-trained model 31 (step S230).

Next, based on the acquired parameter, the processor 21 determines whether the print medium P to print on is a known medium or not (step S240). The parameter and the type of the medium (identifier) acquired from the output values from the intermediate layer, the final output layer Ln or the like may be displayed and the user may constantly be asked to check whether the print medium can be determined as a known medium or not. In this case, whether the print medium is a known medium or not is decided by the user's determination.

When the print medium is determined as a known medium, the processor 21 executes known medium print condition setting processing (step S300). When the print medium is determined as not a known medium, the processor 21 executes unknown medium print condition setting processing (step S400). In both of these print condition setting processings, various parameters that are necessary for printing are set. Therefore, printing using the print parameters is executed (step S250).

Figure 5:
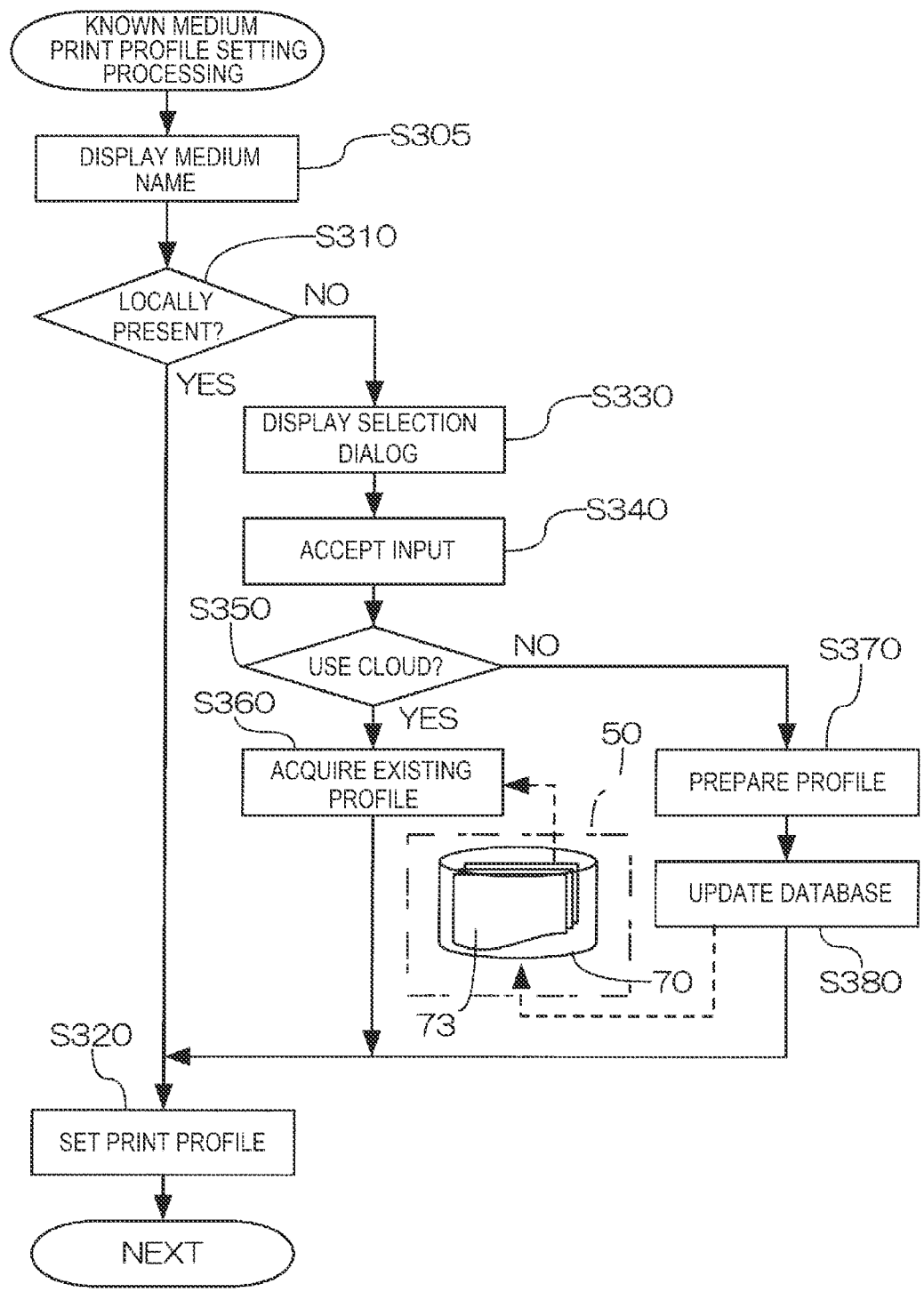
FIG. 5 is a flowchart showing known medium print profile setting processing.

The known medium print condition setting processing (step S300) will now be described with reference to FIGS. 5 to 7. When the print medium P set in the printer 20 is determined as a known medium by the medium determination processing using the pre-trained model 31 (step S220), a medium name corresponding to the acquired identifier is displayed (step S305). The medium name may be displayed on the display 24 provided in the printer 20 or may be displayed on the display unit of the computer, the mobile phone or the like giving the print instruction. Hereinafter, to "display" means one of such display forms.

Next, the processor 21 determines whether a print profile for the known medium whose medium name is displayed is locally present, that is, present in the printer 20, or not (step S310). The print profile 33 is a set of a plurality of print parameters corresponding to the type of the print medium P. In this example, the print profile 33 includes:

(A) a basic LUT (table for converting a digital value into an amount of ink) defined by print settings (resolution, print medium); and (B) an ICC profile.

Print profiles corresponding to principal types of print media P such as normal paper and matte paper for photography are stored in the non-volatile memory 30 in advance. In this case, the processor 21 sets the print profile 33 stored in the non-volatile memory 30 (step S320) and proceeds to "NEXT" to end this processing routine. Subsequently, printing is executed (step S250 in FIG. 4). In this embodiment, on the assumption that a memory card is installed in the printer 20 to perform printing or that the printer 20 prints in response to a print instruction from a terminal having no printer driver, such as a mobile phone, the printer 20 having the print profile 33 is described. However, when printing is performed from a computer or the like having a printer driver, the print profile 33 is set in the computer along with the printer driver installed in the computer. Therefore in step S310, whether a print profile for the known medium whose medium name is displayed is present in the printer driver or not may be determined.

Meanwhile, when the print medium P set in the printer 20 is a known medium but it is determined in step S310 that the print profile 33 for the print medium P is not locally present, the processor 21 displays a selection dialog box (step S330). FIG. 6 shows an example of a selectin dialog box 90. In this example, print profiles for the media A to N are prepared in the non-volatile memory 30 of the printer 20 and print profiles for the media O to T are not prepared. For the media for which a print profile is not prepared, the print profile 33 may be prepared in the cloud. Therefore, when the print medium P determined as a known medium is one of the media O to T, an option of selecting one of the profiles existing in the cloud and an option of using no profile existing in the cloud are displayed.

Subsequently, the processor 21 executes processing of accepting an input from the user, using the selectin dialog box 90 (step S340). The selectin dialog box 90 does not accept other processing as long as these options are displayed. Therefore, when the user selects one of the options via a touch panel, a click on a mouse or the like, presses an "OK" button" and closes the selectin dialog box 90, the processor 21 determines whether the user's selection is the option of using a profile existing in the cloud (step S350). When the user has selected the option of using a print profile existing in the cloud, the processor 21 accesses the machine learning device 50, which is a cloud on the network NT, via the communication unit 23, and acquires the corresponding print profile 73 from the non-volatile memory 70 (step S360). After acquiring the print profile, the processor 21 sets the print profile 73 (step S320) as in the case where the print profile 73 is locally present, and then proceeds to "NEXT" to end this processing routine. Subsequently, printing is performed, as described above.

Figure 6:
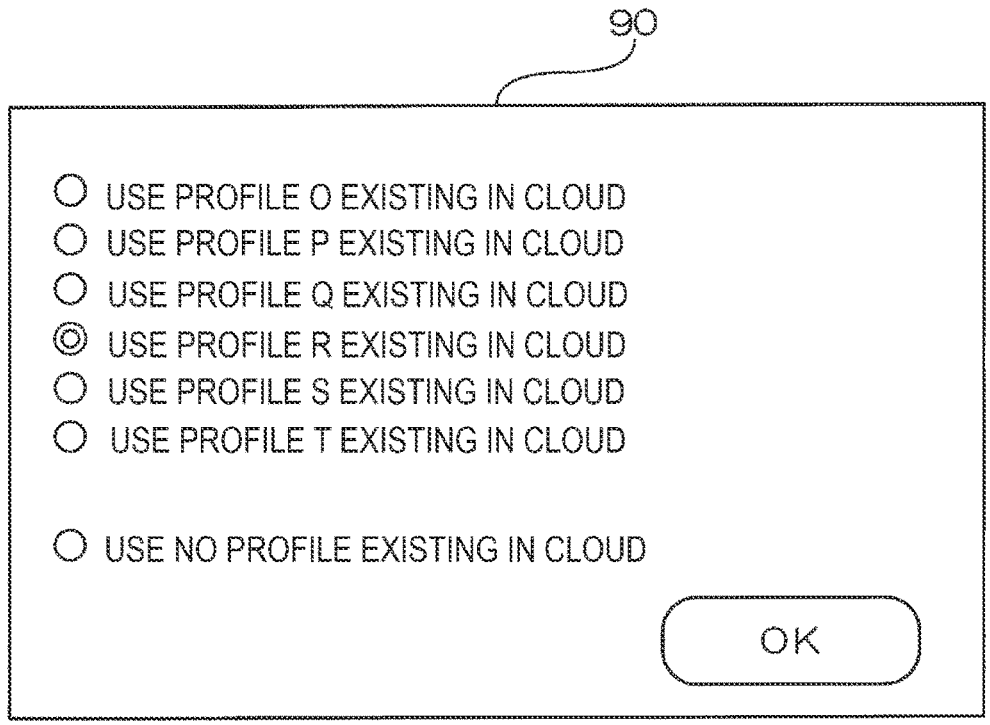
FIG. 6 is an explanatory view illustrating a dialog box for selecting a medium profile existing in a cloud.

When the option of using no print profile existing in the cloud is selected via the selectin dialog box 90 shown in FIG. 6 ("NO" in step S350), the processor 21 performs processing of preparing a profile for that print medium P (step S370). Anew print profile 73 is prepared, for example, using a selection dialog box 91 shown in FIG. 7. In FIG. 7, an ink duty, a set temperature of the drying heater, a feeding speed of the print medium P, and a type of an interlace, are shown as items that can be set. The ink duty represents a maximum value of the amount of ink that can be injected onto the print medium P in an inkjet printer. The temperature of the drying heater is to set a temperature (degrees) with which a heater for drying the ink ejected from the printhead 27 is used, when such a heater is provided. Since the printer 20 in this embodiment is not provided with a heater, this item cannot be set. The item that cannot be set may be hidden or may be displayed in a different form from other options, for example, displayed in gray. The feeding speed is the speed of feeding the print medium P using the paper feeding device 26. The item of the type of the interlace is to set an order or combination of dot formation to form an image.

Figure 7:
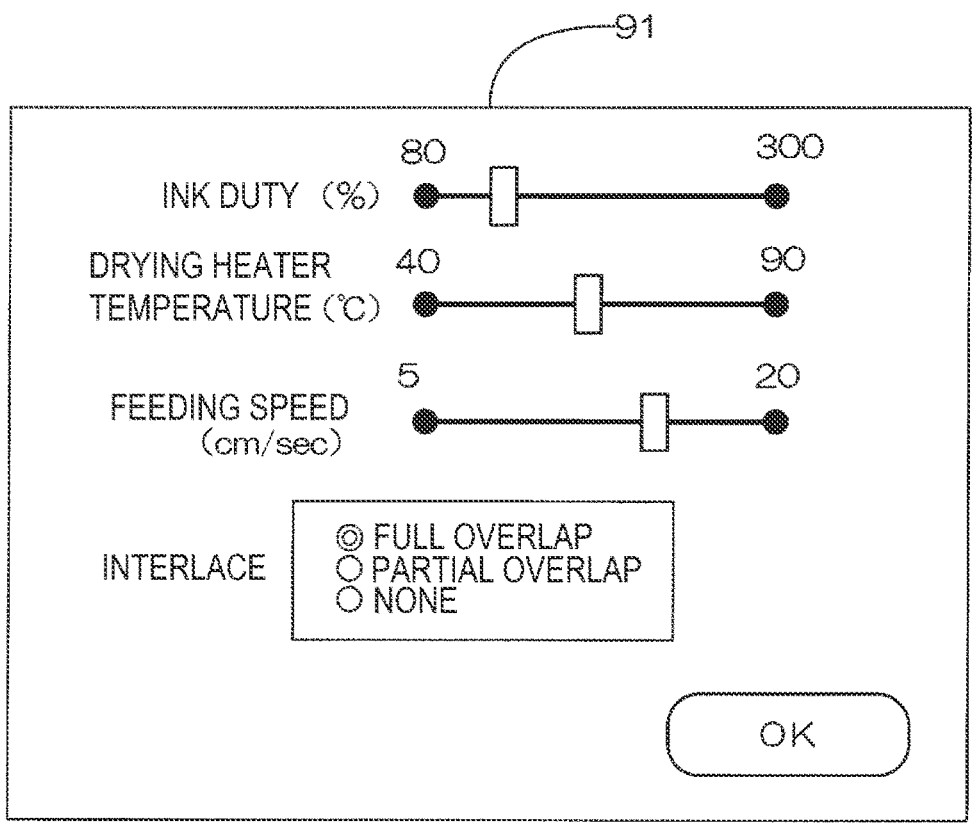
FIG. 7 is an explanatory view illustrating a dialog box for preparing a profile.

When the above settings are mode and the OK button is pressed, the processor 21 uses the ink duty set in FIG. 7, based on the basic LUT included in the print profile 33, performs print color measurement, and prepares an ICC profile for the new print medium.

The processor 21 registers this along with the medium name, as a print profile, in the non-volatile memory 70 storing the database of the print profile 73 (step S380). At this point, information about a preparation condition of the ICC profile is saved as well. The purpose of registering the prepared print profile in the non-volatile memory 70 is to reuse the print profile when a similar print medium P is set in the printer 20. The subsequent setting of the print profile (step S320) and the execution of printing in the print processing routine (step S250 in FIG. 4) are similar to the foregoing processing.

Figure 8:
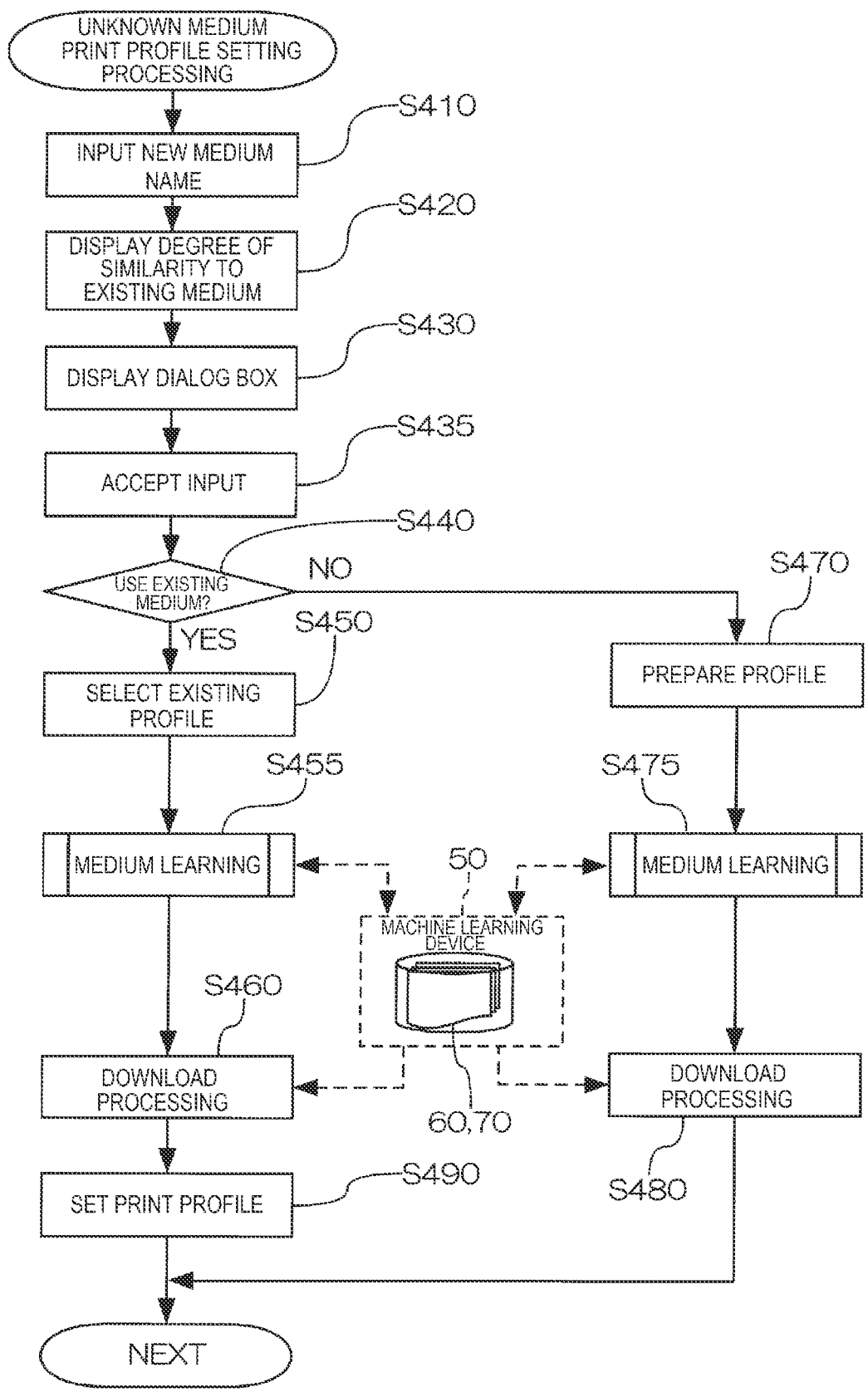
FIG. 8 is a flowchart showing unknown medium print profile setting processing.

The processing in the case where the print medium is determined as a known medium, based on the parameter acquired using the pre-trained model 31, has been described. In contrast, when the print medium is determined not as a known medium but as an unknown medium, based on the acquired parameter, unknown medium print condition setting processing is executed. An outline of this processing is shown in the flowchart of FIG. 8. When the print medium P set in the printer 20 is determined as an unknown medium in step S240 in FIG. 4, the processor 21 first performs processing of prompting the user to input a new medium name (step S410 in FIG. 8). The input of a new medium name can be performed by a technique of selecting a character button displayed on the display 24 by using a touch panel, or from the computer or the mobile phone giving the instruction to print an image.

After the user inputs a new medium name, the processor 21 then performs processing of displaying a degree of similarity to an existing medium, using the data of the spectroscopic reflectance of each medium that is already learned and downloaded from the machine learning device 50 and the data of the spectroscopic reflectance of the print medium P acquired this time (step S420). FIG. 9 shows an example of the presentation of the degree of similarity. In this example, the degrees of similarity to the media A to M, for which the spectroscopic reflectance is already learned, are found by the following equation (1) and shown as a list in a table 95.

$$R=1.0-\Delta E/NR \quad (1)$$

In the equation (1), $\Delta E$ is a color difference found from the two spectroscopic reflectances, and NR is a coefficient for normalizing a degree of similarity R to a range from a value −1.0 to a value +1.0. When the value of R is −1 or lower, R=−1.0 is used.

When the degree of similarity R between print media P is closer to the value 1.0, it means that the print media P have more similar optical characteristics. When the degree of similarity R is closer to the value −1.0, it means that the print media P have more different optical characteristics. After displaying the degree of similarity R, the processor 21 performs processing of displaying a selection dialog box 97 to allow the user to designate which medium to select as a similar medium (step S430). FIG. 10 shows an example of the selection dialog box 97. Using this selection dialog box 97, the user refers to the similarity shown in FIG. 9 with respect to the unknown medium, that is, the new medium, and chooses whether to select a print profile 33 from the existing media or to input totally new print settings and create a print profile 33 for the new medium.

In the selection dialog box 97, the identifiers indicating print media P with a high degree of similarity and the degrees of similarity found by the equation (1) are shown in order from the highest numerical value of the degree of similarity. In the selection dialog box 97, five types of identifies (media types in the illustration) are shown. However, since a scroll bar is provided, the user can scroll the field showing the media types in order from the highest degree of similarity to check the rest of the media types and the degrees of similarity thereof. Even when it is determined that the print medium P set in the printer 20 is not an existing medium, in some cases, the user may select a medium type with a relatively high degree of similarity, based on the degree of similarity and the actual state of the print medium P. In such cases, the user views what is shown in the selection dialog box 97 and usually selects the medium type with the highest degree of similarity and presses an "Enter" button. However, based on the user's own experience, the user can select a desired medium type even if the degree of similarity is not the highest or even if the degree of similarity is low.

Figure 11:
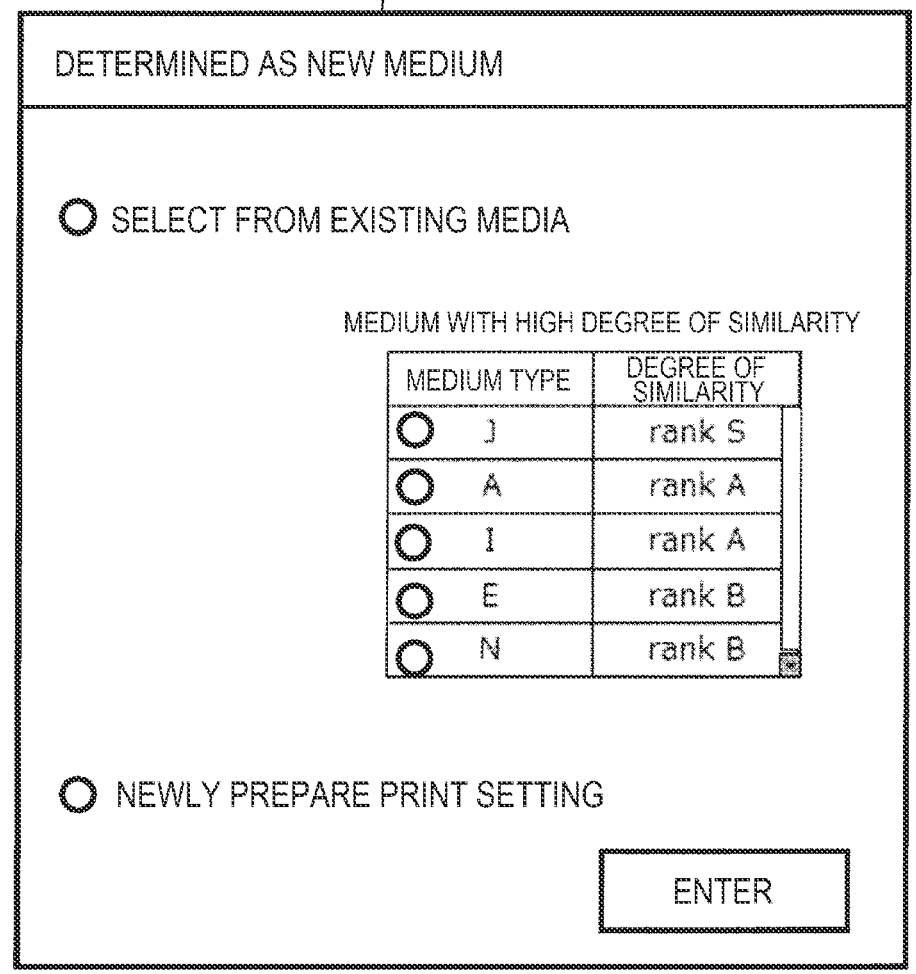
FIG. 11 is an explanatory view showing another example of the dialog box when a medium is determined as a new medium.

Although FIG. 10 shows the existing medium types in order from the highest degree of similarity, the order may be reversed. Also, for example, the existing medium types may be shown in order of medium type name. Also, the existing medium types may be shown in random order. Moreover, the exiting medium types may be ranked in advance, based on not only the degree of similarity but also various other conditions, and may be shown along with the ranking. FIG. 11 shows an example of this. In a selection dialog box 98 shown in FIG. 11, the medium types are shown according to the categories of ranks S, A, and B. The ranks may correspond to the degrees of similarity. Also, the print medium P for which the pre-trained model 31 shows the highest parameter may be categorized as rank S, and a medium having a paper quality or ink absorption capability similar to this print medium P may be ranked high, such as rank A.

When an existing medium is selected via the selection dialog box 97 or 98 ("YES" in step S440), the print profile 33 corresponding to the selected medium type is selected from among the existing print profiles 33 stored in the non-volatile memory 30 (step S450) and medium learning is performed, based on this (step S455). The medium learning is the processing of retraining on the assumption that the data of the spectroscopic reflectance of this print medium P acquired using the spectroscopic reflectometer 43 is the data of the selected medium type. The actual processing is executed by the machine learning device 50. That is, the processor 21 outputs the type of the existing medium accepted via the selection dialog box 97 or 98 and the data of the spectroscopic reflectance acquired using the spectroscopic reflectometer 43, to the machine learning device 50 via the communication unit 23 and thus causes the machine learning unit 60 of the machine learning device 50 to perform retraining.

As the retraining is performed by the machine learning unit 60, the database of the print profile 73 in the non-volatile memory 70 is also updated in response to the result of the retraining. On receiving a notification of the completion of the retraining, the processor 21 of the printer 20 downloads the pre-trained model 65 to the non-volatile memory 30 as the pre-trained model 31 used by the printer 20, according to need. The processor 21 also downloads a combination of the type of the print medium P and the print profile used for the print medium P, to the non-volatile memory 30 from the database of the print profile 73 in the non-volatile memory 70 (step S460). Thus, from this point onward, the pre-trained model 31 and the print profile 33 acquired by the retraining are available for use in the printer 20.

In the state where the selection dialog box 97 or 98 is displayed, the user can also choose to newly configure print settings instead of using the print profile of an existing medium type. In this case, the determination in step S440 is "NO" and the processing from step S470 onward is executed. In this case, a new profile is prepared (step S470) instead of selecting an existing profile (step S450) and using the existing profile. The preparation of a new print profile (ICC profile) is performed, using the setting of the print medium P with the highest degree of similarity. The user prepares a new print profile by setting various parameters forming the print profile, as described with reference to FIG. 7.

After the new print profile is prepared, an instruction to retrain about the medium (step S475) is given and downloading from the machine learning device 50 (step S480) is executed, as in the case where an existing profile is selected (step S450), since the medium is determined as an unknown medium. These processes are similar to the processes of steps S455 and S460.

After the above processing (steps S440 to S480), the processor 21 sets the print profile corresponding to the new medium and proceeds to "NEXT" to execute printing in the print processing routine (step S250 in FIG. 4).

In the printing system 10 according to this embodiment as described above, when printing on the print medium P, the spectroscopic reflectance of an unprinted area on the print medium P is measured by the spectroscopic reflectometer 43 and the measured spectroscopic reflectance is applied to the pre-trained model 31. Thus, printing on the print medium P is performed after the type of the print medium P is specified. When the print medium P cannot be univocally specified, auxiliary information about the type of the print medium P, for example, the degree of similarity R, is outputted and displayed. Therefore, the user can easily specify the type of the print medium P. In response to this specification, the print profile corresponding to the type of the print medium is applied and printing on the print medium P can be performed with appropriate print conditions.

In the embodiment, the degree of similarity R for each type of print medium, which is auxiliary information, is displayed when the print medium P to print on is an unknown medium. Therefore, the user can learn which one of the existing media the unknown medium is similar to, and can cause the machine learning unit 60 to retrain about the print medium, using the existing medium as a trainer.

Also, in the embodiment, the type of the print medium P is specified, solely based on the spectroscopic reflectance of an unprinted area on the print medium P, or auxiliary information is outputted for the specification. Therefore, the embodiment is advantageous in that the configuration of the device can be simplified. Also, since the spectroscopic reflectometer 43 is provided in the printhead 27, the spectroscopic reflectance of the print medium P can be acquired by an ordinary printing method in which the print medium P to print on is set in the printer 20. Therefore, the troublesome work of taking the print medium P all the way to a measuring device to measure the spectroscopic reflectance of the print medium P is not necessary. Moreover, in this embodiment, the printer 20 and the machine learning device 50 are coupled to each other via the network NT. Therefore, when the print medium P is a medium whose type cannot be specified, supervised machine learning can be executed again and the pre-trained model and the print profile or the like can be updated in real time.

In this embodiment, the machine learning device 50, which is separate from the printer 20, execute supervised machine learning. Therefore, a device configuration for machine learning need not be prepared in the printer 20. Also, in this embodiment, the pre-trained model 65 trained by the machine learning device 50 is downloaded to the non-volatile memory 30 of the printer 20 and becomes available for use in the printer 20 by itself. Therefore, the printer 20 need not exchange data with the machine learning device 50 in order to determine the type of the print medium P, using the data of the spectroscopic reflectance. While FIG. 1 shows the printing system 10 where the printer 20 and the machine learning device 50 are coupled to each other, a printing system using only the printer 20 may be employed when the retraining of the pre-trained model is not performed.

B. Second Embodiment

Figure 12:
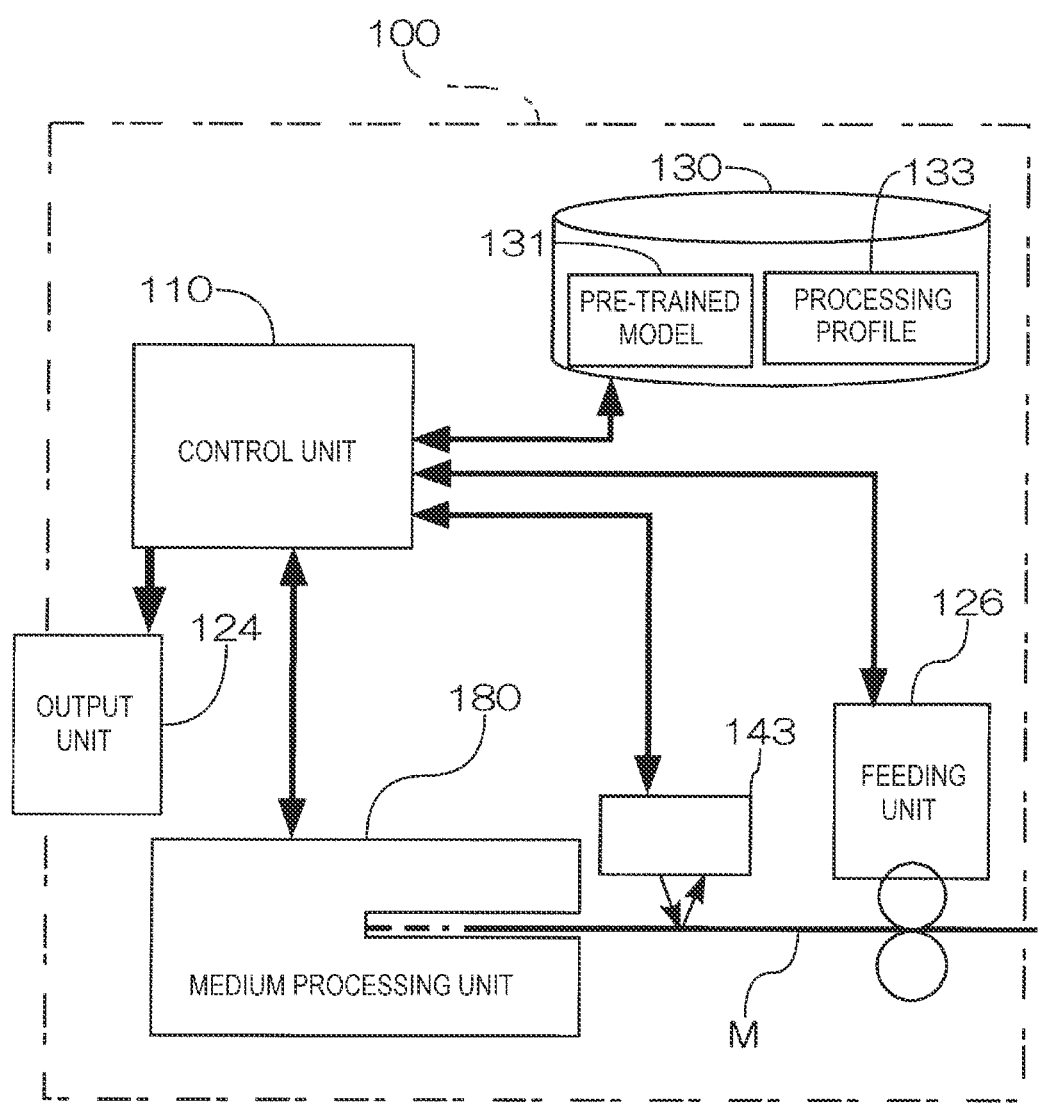
FIG. 12 shows a schematic configuration of a medium information providing device according to a second embodiment.

A second embodiment is a medium information providing device 100 shown in FIG. 12. The medium information providing device 100 has a configuration similar to the printer according to the first embodiment except for the configuration for printing, and having a medium processing unit 180. The medium information providing device 100 provides auxiliary information to assist the determination of the type of a medium M. The medium information providing device 100 includes: a control unit 110 as a medium recognition unit recognizing the type of a medium with a predetermined parameter, using a pre-trained model 131 generated by machine learning provided with spectroscopic information of a ground color of the medium and an identifier indicating the type of the medium, for a plurality of types of media M, and using the identifier as a trainer; a feeding unit 126 feeding the medium M; a spectroscopic information acquisition unit 143 acquiring the spectroscopic information of the ground color of the medium that is fed; an output unit 124 outputting auxiliary information about the type of the medium M, using a result of recognition based on the pre-trained model 131 when the acquired spectroscopic information is inputted to the control unit 110 as the medium recognition unit; and the medium processing unit 180 processing the medium M whose type is specified using the auxiliary information, with an appropriate processing condition corresponding to the type. The pre-trained model 131 is stored in a memory 130 along with a processing profile 133 recoding the content of processing necessary for each type of the medium M. The medium information providing device 100 does not necessarily need the feeding unit 126 or the medium processing unit 180. Instead of the feeding unit 126, the user may bring the medium into the spectroscopic information acquisition unit 143 or the medium processing unit 180. The spectroscopic information acquisition unit 143 and the medium processing unit 180 may be not built in the medium information providing device 100 and the medium may be processed in another plant or device.

In this medium information providing device 100, auxiliary information for determining the type of the medium, based on the spectroscopic information of the ground color of the medium, is outputted. Therefore, the type of the medium M to be processed can be easily determined. Such a medium information providing device 100 is advantageous in that, when recycling a paper used for printing, the type of the medium can be easily determined and the medium can be processed with an appropriate condition. This is because, when recycling a medium such as a print sheet, the processing method, the processing procedure or the like often need to be changed, depending on the type of the medium. To recycle a medium such as a print medium, a processing step such as cutting the medium or dissolving the medium with a chemical agent may be needed. In such a case, it is advantageous to be able to easily specify the type of the medium. In such a case, in the medium information providing device 100, since auxiliary information about the type of the medium is outputted based on the spectroscopic information of the ground color of the medium, the processing of the medium by the medium processing unit 180 or the like can be made easier.

C. Other Embodiments

The printing system according to the present disclosure can be implemented according to the aspects described below.

(1) A first aspect is directed to a printing system for printing on a print medium. The printing system performs printing on a print medium and includes: a storage unit storing, for a plurality of types of print media, a pre-trained model generated in advance by machine learning based on spectroscopic information of an unprinted area on the print medium and an identifier indicating the type of the print medium and using the identifier as a trainer; a spectroscopic information acquisition unit acquiring the spectroscopic information of the unprinted area on the print medium to print on; an output unit outputting auxiliary information about the type of the print medium, using a result of applying the acquired spectroscopic information to the pre-trained model that is stored; and a specification unit accepting a specification of the type of the print medium using the auxiliary information outputted from the output unit.

In this printing system, the auxiliary information about the type of the print medium is outputted by applying the spectroscopic information of the unprinted area on the print medium to the pre-trained model. Therefore, the user can easily specify the type of the print medium.

(2) In such a printing system, the spectroscopic information may be at least one of a spectroscopic reflectance and a spectroscopic transmittance. The spectroscopic information acquisition unit may have a measuring unit measuring at least one of the spectroscopic reflectance and the spectroscopic transmittance of the unprinted area on the print medium. Thus, it suffices to simply acquire the spectroscopic reflectance of the print medium and the configuration of the spectroscopic information acquisition unit can be simplified. The spectroscopic transmittance may be used as the spectroscopic information. Also, both the spectroscopic reflectance and the spectroscopic transmittance may be used. Generally, when the spectroscopic reflectance is used, a light projecting unit that projects light and a light receiving unit that receives reflected light can be arranged together at one side of the print medium and therefore the configuration can be simplified. A device performing actual measurement such as a spectroscopic reflectometer detecting the spectroscopic reflectance or the like may be incorporated in the printing system, for example, in the printing unit. Alternatively, this device may be provided separately from the printing system, and the spectroscopic information acquisition unit may acquire the spectroscopic reflectance or the like via communication or the like.

(3) In such a configuration, the storage unit may have a retraining unit retraining the pre-trained model for a print medium determined as an unknown print medium depending on the pre-trained model, using spectroscopic information of the unknown print medium and an identifier provided for the unknown print medium, and an update unit updating the stored pre-trained model, using a result of learning by the retraining unit. Thus, the pre-trained model based on machine learning can be made to correspond to a new type of print medium.

(4) In such a configuration, the printing system may have a print condition setting unit setting a print condition suitable for the unknown print medium, for the print medium determined as the unknown print medium. Thus, even for a new type of print medium, a print condition suitable for this print medium can be set.

(5) The printing system may have a print condition setting unit setting a print condition suitable for the print medium when the type of the print medium is specified, based on the auxiliary information outputted from the output unit. When the type of the print medium can be specified using the result of application to the pre-trained model, the print condition setting unit can set a print condition suitable for the print medium of the specified type.

(6) In such a configuration, the output unit may have a display unit displaying the auxiliary information. The print condition setting unit may have a specification unit by which a user specifies the print medium, using the auxiliary information displayed on the display unit. Since the auxiliary information is displayed on the display unit, the user can easily specify the type of the print medium. The display unit may be provided on the side of a printer performing printing or may be provided on the side of a terminal such as a computer or a mobile phone giving a print instruction.

(7) In such a configuration, the output unit may display information representing a degree to which the print medium for which the spectroscopic information is acquired by the spectroscopic information acquisition unit is similar to an already learned print medium learned when the pre-trained model is generated, as one piece of the auxiliary information on the display unit. Thus, the user can learn the degree to which a print medium of a new type is similar to the already learned print medium, and therefore can easily specify the type of the print medium. Such a specification of a print medium of a new type includes not only univocally defining the type of the print medium but also specifying which existing print medium the print medium of the new type is similar to. In such a case, machine learning can be performed using an identifier indicating the type of the print medium of a similar type as a trainer, and the pre-trained model may thus perform retraining.

(8) In such a configuration, when the print medium is not an already learned print medium, the print condition setting unit may cause a user to select whether to print using the print condition for the already learned print medium or to prepare a new print condition setting and print. Thus, whether to set a new print condition or not can be properly determined.

(9) In such a configuration, when the preparation of the new print condition setting is selected, the output unit may display a degree of similarity computed based on the spectroscopic information as information representing a degree to which the print medium determined as not the already learned print medium is similar to the already learned print medium, as one piece of the auxiliary information on the display unit. Thus, the user can easily learn the degree of similarity of the type of the print medium and can easily specify the type of the print medium.

(10) One of another aspects is directed to a print medium specifying method for specifying a type of a print medium to print on. The print medium specifying method may include: preparing, for a plurality of types of print media, a pre-trained model generated by machine learning based on spectroscopic information of an unprinted area on the print medium and an identifier indicating the type of the print medium and using the identifier as a trainer; acquiring the spectroscopic information of the unprinted area on the print medium to print on; outputting auxiliary information about the type of the print medium, using a result of recognition where the acquired spectroscopic information is applied to the pre-trained model; and accepting a specification of the type of the print medium using the outputted auxiliary information. Thus, the auxiliary information about the type of the print medium is outputted by applying the spectroscopic information of the unprinted area on the print medium to the pre-trained model. Therefore, the user can easily specify the type of the print medium. In this case, in response to the specification of the print medium, printing may be executed with a print condition corresponding to the type of the print medium.

(11) One of another aspects is directed to a medium information providing device providing auxiliary information to assist determination of a type of a medium to be processed. The medium information providing device may include: a storage unit storing, for a plurality of types of media, a pre-trained model generated by machine learning provided with spectroscopic information of a ground color of the medium and an identifier indicating the type of the medium and using the identifier as a trainer; a spectroscopic information acquisition unit acquiring the spectroscopic information of the ground color of the medium to be processed; and an output unit outputting auxiliary information about the type of the medium, using a result of applying the acquired spectroscopic information to the pre-trained model. Thus, the auxiliary information about the type of the medium is outputted by applying the spectroscopic information of the ground color of the medium to the pre-trained model. Therefore, the user can easily specify the type of the medium. Also, in response to the specification, processing can be performed with a condition corresponding to the type of the medium.

(12) In the foregoing embodiments, a part of the configurations implemented by hardware may be replaced by software. At least a part of the configurations implemented by software can be implemented by a discrete circuit configuration. Also, when a part or all of the functions in the present disclosure are implemented by software, the software (computer program) can be provided in the form of being stored in a computer-readable recording medium. The "computer-readable recording medium" is not limited to a portable recording medium such as a flexible disk or a CD-ROM but also includes an internal storage device in a computer, such as various RAMs and ROMs, and an external storage device fixed to a computer, such as a hard disk. That is, the "computer-readable recording medium" has a broad meaning including any recording medium that can fix a data packet instead of temporarily storing.

The present disclosure is not limited to the foregoing embodiments and can be implemented according to various aspects without departing from the spirit and scope of the present disclosure. For example, a technical feature in the embodiments corresponding to a technical feature in each of the aspects described in the summary section can be suitably replaced or combined in order to solve a part or all of the foregoing problems or in order to achieve a part or all of the foregoing effects. Also, the technical feature can be suitably deleted unless described as essential in the specification.

What is claimed is:

1. A printing system for printing on a print medium, the printing system comprising:
a memory storing, for a plurality of types of print media, a pre-trained model generated in advance by machine learning based on spectroscopic information of an unprinted area on the print medium and an identifier indicating the type of the print medium and using the identifier as a trainer;
a spectroscopic reflectometer acquiring the spectroscopic information of the unprinted area on the print medium to print on;
a processor outputting auxiliary information including, for each of the types of the print medium, a parameter representing a degree to which the print medium for which the spectroscopic information is acquired by the spectroscopic reflectometer is similar to each of the types of the print medium, using a result of applying the acquired spectroscopic information to the pre-trained model that is stored; and
a display displaying the auxiliary information,
the processor accepting a specification of the type of the print medium using the auxiliary information displayed on the display.

2. The printing system according to claim 1, wherein
the spectroscopic information is at least one of a spectroscopic reflectance and a spectroscopic transmittance, and
the spectroscopic reflectometer measures at least one of the spectroscopic reflectance and the spectroscopic transmittance of the unprinted area on the print medium.

3. The printing system according to claim 1, further comprising
a retraining processor retraining the pre-trained model for a print medium determined as an unknown print medium based on the pre-trained model, using spectroscopic information of the unknown print medium and an identifier provided for the unknown print medium,
the processor updating the stored pre-trained model, using a result of training by the retraining processor.

4. The printing system according to claim 3, wherein
the processor sets a print condition suitable for the unknown print medium, for the print medium determined as the unknown print medium.

5. The printing system according to claim 1, wherein
the processor sets a print condition suitable for the print medium when the type of the print medium is specified, based on the auxiliary information displayed on the display.

6. The printing system according to claim 5, wherein
a user specifies the print medium by the processor, using the auxiliary information displayed on the display.

7. The printing system according to claim 5, wherein
when the print medium is not an already learned print medium, the processor causes a user to select whether to print using the print condition for the already learned print medium or to prepare a new print condition setting and print.

8. The printing system according to claim 7, wherein
when the preparation of the new print condition setting is selected, the processor outputs the auxiliary information on the display.

9. A print medium specifying method for specifying a print medium to print on, the method comprising:
preparing, for a plurality of types of print media, a pre-trained model generated by machine learning based on spectroscopic information of an unprinted area on the print medium and an identifier indicating the type of the print medium and using the identifier as a trainer;
acquiring the spectroscopic information of the unprinted area on the print medium to print on;
outputting auxiliary information including, for each of the types of the print medium, a parameter representing a degree to which the print medium for which the spectroscopic information is acquired is similar to each of the types of the print medium, using a result of recognition where the acquired spectroscopic information is applied to the pre-trained model; and
accepting a specification of the type of the print medium using the outputted auxiliary information.

10. A medium information providing device providing auxiliary information to assist determination of a type of a medium to be processed, the medium information providing device comprising:
a memory storing, for a plurality of types of media, a pre-trained model generated by machine learning provided with spectroscopic information of a ground color of the medium and an identifier indicating the type of the medium and using the identifier as a trainer;
a spectroscopic reflectometer acquiring the spectroscopic information of the ground color of the medium to be processed; and
a processor outputting the auxiliary information using a result of applying the acquired spectroscopic information to the pre-trained model, the auxiliary information including, for each of the types of the medium, a parameter representing a degree to which the medium for which the spectroscopic information is acquired by the spectroscopic reflectometer is similar to each of the types of the medium.

* * * * *